United States Patent [19]

Mercuzot

[11] 4,356,420

[45] Oct. 26, 1982

[54] BRUSH HOLDER FOR ROTATING ELECTRICAL MACHINES

[75] Inventor: Dominique Mercuzot, Talant, France

[73] Assignee: CEM Compagnie Electro Mecanique, Paris, France

[21] Appl. No.: 138,722

[22] Filed: Apr. 9, 1980

[30] Foreign Application Priority Data

Apr. 11, 1979 [FR] France ........................ 79 09178

[51] Int. Cl.[3] ........................ H02K 13/00

[52] U.S. Cl. ........................ 310/239; 310/242

[58] Field of Search ........................ 310/238–247

[56] References Cited

U.S. PATENT DOCUMENTS

| | | | |
|---|---|---|---|
| 626,708 | 6/1899 | Lundell | 310/247 UX |
| 2,748,302 | 5/1956 | Boeckel | 310/247 |
| 2,798,176 | 7/1957 | Seyfried | 310/247 |
| 2,948,795 | 8/1960 | Brinster | 310/246 |
| 3,480,814 | 11/1969 | Amrein | 310/247 |
| 3,656,018 | 4/1972 | Maher | 310/247 |

*Primary Examiner*—R. Skudy

*Attorney, Agent, or Firm*—Burns, Doane, Swecker & Mathis

[57] ABSTRACT

A brush-holder for rotating electrical machines includes a brush and a compression spring disposed in a shaped metallic sleeve encased in an insulating support adapted to be mounted on the frame of the engine. The insulating support includes at least one projecting stop which cooperates with a notch provided on the sleeve, so that the sleeve is precisely located at a predetermined longitudinal position within a sheath on the support. In addition to positioning the sleeve, the stop also serves to limit travel of the spring as the brush wears down.

8 Claims, 6 Drawing Figures

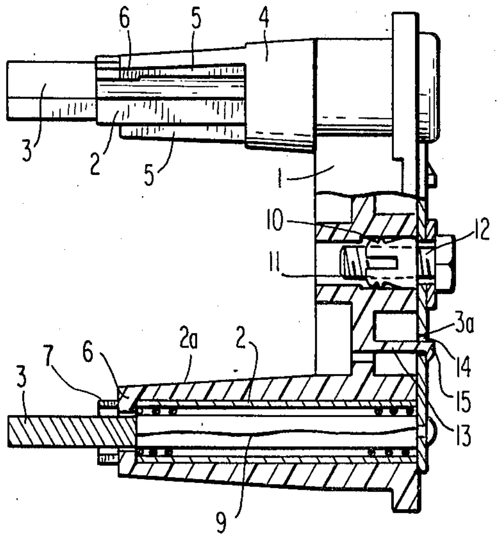
FIG 2
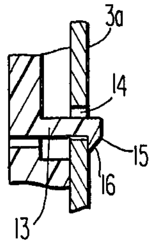
FIG 2a
FIG 3
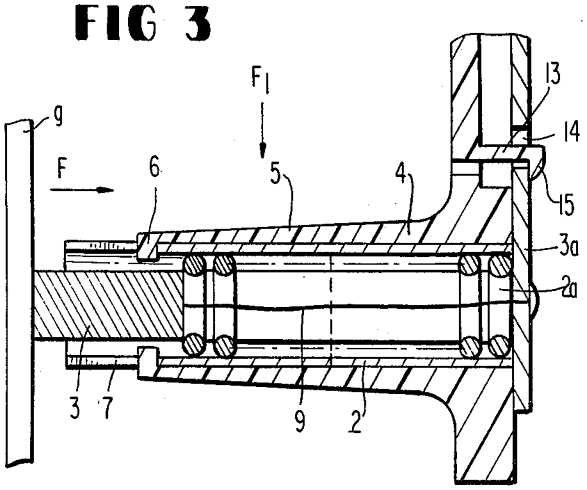
FIG 4
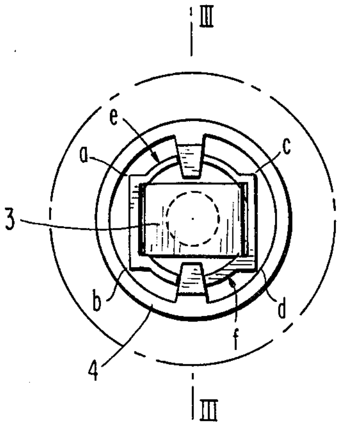
FIG 5
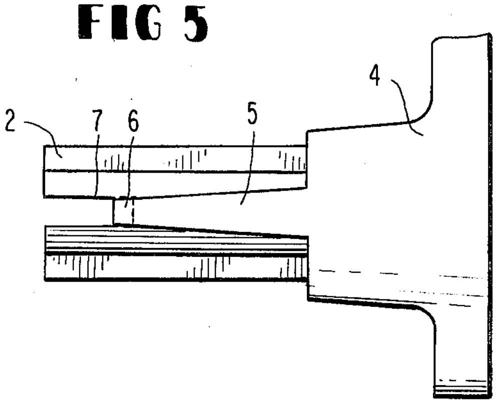
FIG 6
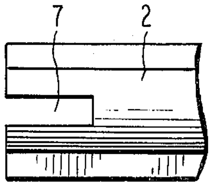

BRUSH HOLDER FOR ROTATING ELECTRICAL MACHINES

BACKGROUND OF THE INVENTION

The present invention relates to tubular brush holders intended for use in a rotating electrical machines, such as generators and motors, and more particularly to brush holders in which the brush has a compression spring, both of which are set within a tubular support that functions as the guide for the movement of the brush.

Several different embodiments of brush holders are presently known. In one of them, the tubular support for the brush is a solid piece of machined metal surrounded by an insulating sleeve which has been molded over it. This embodiment is very costly to make because the brushes are generally rectangular in shape and the machining of the inside of the metal piece necessary to obtain the proper configuration is quite difficult. To this expense, the price of molding the insulating sleeve over the metal piece must be added.

In another embodiment of the brush holder, a metallic sheath of a drawn shape, suitable to guide the brush during its movement, is encased in plastic material molded over it. The disadvantage of this embodiment is that the high pressure necessary for injecting plastic materials may lead to a deformation of the sheath, with a resulting chance of the brush getting stuck in the sheath. If the thickness of the metal is increased to overcome this very serious drawback, then the cost of the brush holder will be prohibitive.

It has also been proposed to hold a metallic casing, acting as the guide for the brush, in a separately molded insulating sleeve, by means of friction. In this case, it is difficult to achieve precise longitudinal location of the casing within the sleeve. In addition, the differences in the coefficients of expansion for the metal and the plastic material may lead to detrimental play of the casing within the sleeve, in the case of heating of the elements during operation.

In each of these known embodiments, it is common to provide a stop which projects into the tubular support, to prevent the compression spring from moving beyond a predetermined point as the contact brush wears down. The incorporation of the stop into the support presents additional manufacturing problems.

OBJECTS AND BRIEF SUMMARY OF THE INVENTION

It is therefore an object of the present invention to provide a novel tubular brush holder, and method for assembling the same, wherein a shaped metallic sleeve is associated with an insulating support in an economical fashion which avoids the previously discussed disadvantages of the prior art.

It is another object of the present invention to provide a novel tubular brush holder which is easy to assemble, facilitates simple installation and removal of brushes and provides reliable operation.

In accordance with the present invention, an insulating support made of plastic material includes a sheath into which a metallic sleeve is inserted with mild friction between the sleeve and the sheath. The support includes at least one inwardly projecting stop which cooperates with a notch provided on the sleeve in such a manner that the sleeve is located in a very precisse position upon encasment of the sleeve in the sheath.

It is preferable to provide the stop at the end of a tongue which projects from the sheath on the insulating support. This arrangement provides a certain amount of elasticity to the interface between the support and the sleeve and allows the sleeve to be fully encased within the support up to the projecting stop during assembly of the brush holder. Preferably, the stop is set at a perpendicular angle with respect to a curvilinear section of the sleeve on which the notch is located. This arrangement of the sleeve and the notch provides a space between the holder and a conventional brush having a rectangular cross-section.

According to a further feature of the invention, the stop has a radial dimension which is sufficient for it to function as an abutment for the spring, to limit its travel as the brush wears down, thereby preventing the spring from rubbing against the current collector and damaging it.

The description which follows, with reference to the attached drawings, is given as non-limitative example and will facilitate an understanding as to the manner in which the invention may be realized.

BRIEF DESCRIPTION OF THE DRAWINGS

FIG. 2 is a side view of the brush holder in partial cross-section along the line II—II of FIG. 1.

FIG. 2*a* is an enlarged detail cross-sectional view of a portion of FIG. 2.

FIG. 3 is a cross-sectional view along the line III—III of FIG. 4, illustrating one of the brushes with its spring.

FIG. 4 is a front view of the apparatus, looking at the apparatus in the direction given by the arrow F in FIG. 3.

FIG. 5 is a top view of the brush holder, looking in the direction of arrow $F_1$ in FIG. 3.

FIG. 6 is an enlarged detailed view of a portion of FIG. 5.

DESCRIPTION

Figure 1:
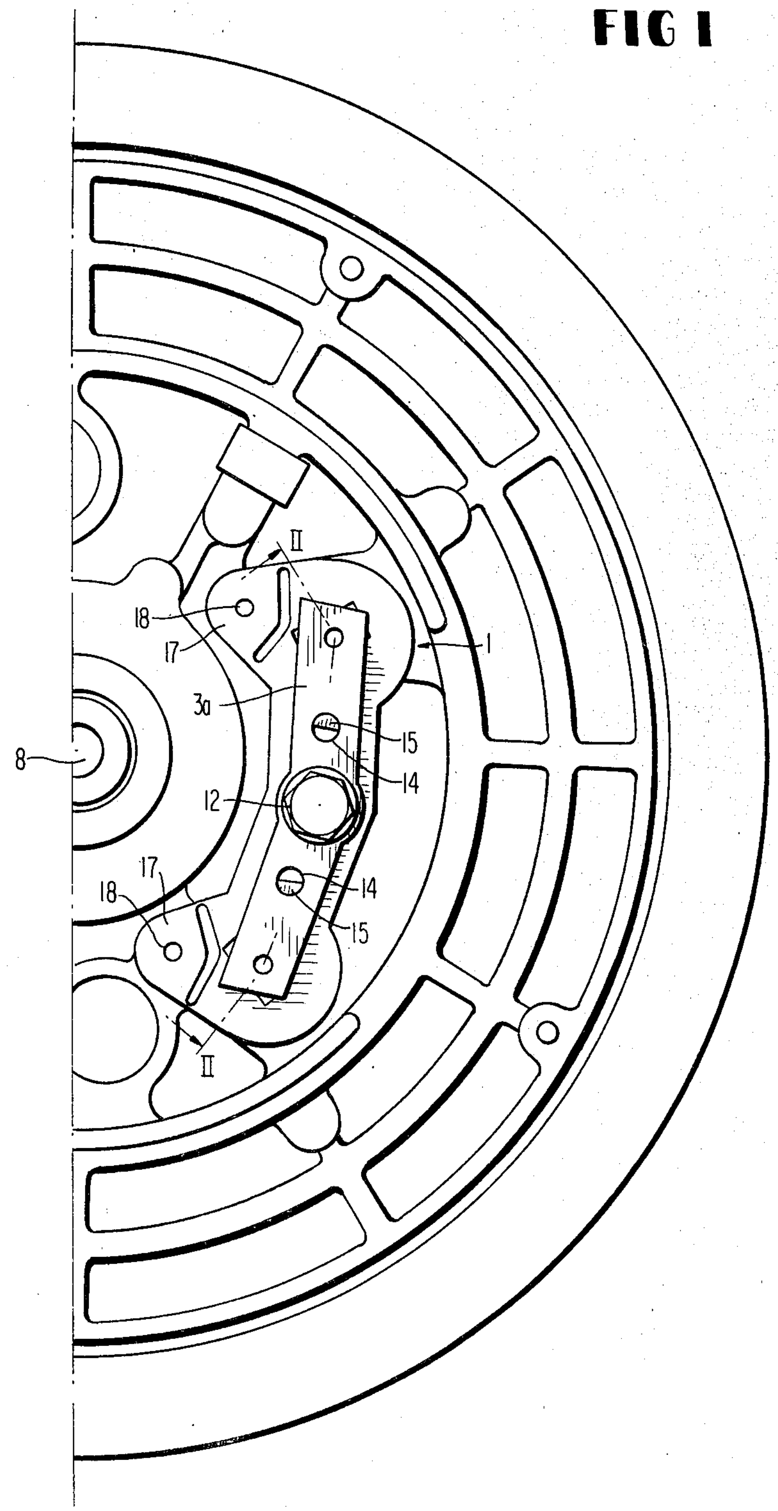
FIG. 1 is a plan view of the illustrated embodiment of the invention mounted on the frame of an electrical machine.

In the following exemplary description of one embodiment of the invention, a brush-holder with twin brushes, intended for use in rotating electrical machines with axial interferric space, will be described in detail. The brush-holder illustrated in the drawings includes an insulating support 1, two metallic sleeves 2 encased within the support, and two twin brushes 3 electrically connected by a connector 9 to a metallic connecting plate 3*a*. The support 1 is preferably a unitary piece of thermoplastic charged material which is molded by injection. It is in the shape of part of a crown having its center on the axis of rotation 8 of the machine.

The support 1, arranged on a fixed flange on the frame of the machine, includes two sheaths 4, parallel with one another, extending from the support toward the current collector (shown at g in FIG. 3). Each sheath is provided with an internal cavity the cross-section of which (FIG. 4) presents two parallel rectilinear sides a-b, c-d, and two other sides a-c, b-d having a curvilinear and concave central part e, f included between two linear segments. In the cavity of each sheath, a metallic sleeve 2 is inserted, from the right as viewed in FIG. 3, with mild friction between the sleeve and the sheath, before the conducting plate 3*a* is set into place.

The sleeve is preferably made from a drawn metallic shape, the external contour of which fits the contour of the sheath and the similar internal contour of which is circumscribed to the rectangular cross-section of the brush 3 with enough play so that the brush may slide freely therein.

The sheath, the length of which is clearly shorter than that of the sleeve 2, has two diametrically opposed thin tongues 5 which extend along the curvilinear parts of the sleeve. These tongues terminate at two stops 6 projecting 90° toward the inside of the sleeve and penetrating into longitudinal notches or slots 7 provided in the curvilinear parts of the sleeve and extending to one edge thereof. The tongues 5 provide sufficient open space around the sleeve 2 and the stops 6 to enable the brush holder to be visually checked, to thereby ensure that the sleeve 2 has been fully inserted into the sheath 4 so that the stops engage the innermost ends of the slots 7.

It will be appreciated that the notches or slots 7 can be given a length such that, at the time of the encasement of the sleeve in the sheath, the final position of the sleeve will be precisely set by the abutment of the stop 6 against the bottom of the corresponding notch 7. The sleeve which, at its opposite end, terminates evenly with the bottom of the support 1, is thus held in place when the conducting plate **3*a* is set in place, being retained at one end by the stop 6 and, at the other end, by the plate 3*a***.

In addition, the placement of the stop 6 and of the notches 7 on the curvilinear parts of the sleeve, at the location where a space is provided between these parts and the brushes as shown on FIG. 4, allows the stops 6 to have a radial projection which is sufficient to form an abutment for limiting the movement of the compression spring **2*a*** without impairing the sliding movement of the brush, when the wear on the brush requires that it be changed. This arrangement insures that in case of lack of proper surveillance, the spring cannot come into contact with the current collector and damage its blades.

The support 1 has, on its flat external surface, a central hole 10 in which is set a threaded metallic insert 11. A screw 12, screwed into this insert, fixes the plate **3*a* in place and provides a connecting point between the plate and the external circuit. To avoid the sudden ejection of the plate under the pressure of the springs when the screw 12 is removed, the support includes two elastic tongues 13 which fit in oblong holes 14 in the plate, each of which has a small stop 15 with a taper 16 on its outside surface (FIG. 2*a***).

When the plate **3*a* is put in place by pressing it against the support, the tongues 13 are elastically bent through the action of the slanted surfaces 16 until the stops 15 set themselves on the plate and lock it in place. The screw 12** provides an added measure of rigidity to the structure.

For mounting on the frame of the electrical machine, the support is provided with two wings 17 having holes 18 for the passage of the screws or other suitable fastening devices.

It will be apparent that the present invention may be embodied in other specific forms without departing from the spirit or essential characteristics thereof. For example, the invention can be utilized on electrical machines having radial interferric space and a cylindrical current collector. Likewise, it is not limited to brush-holders for two twin brushes, but may be utilized with a single brush or with multiple brushes, as well as with brushes having a cross-sectional shape which is other than rectangular.

The presently disclosed embodiment is therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. A brush holder for supporting an electrically conductive brush and a compression spring in an operative position on a rotating electrical machine, comprising:

a metallic sleeve having a longitudinal notch extending to one edge thereof;

an insulating support having a cavity in which the metallic sleeve is encased; and a stop member projecting from said support into engagement with the notch in said sleeve, to thereby limit the longitudinal movement of said sleeve in one direction within said cavity.

2. A brush holder for supporting an electrically conductive brush and a compression spring in an operative position on a rotating electrical machine, comprising:

a metallic sleeve having a longitudinal notch therein;

an insulating support having a cavity into which the metallic sleeve is encased and an elastic tongue member disposed parallel to the axis of said sleeve; and a stop member mounted on one end of said tongue member and projecting from said tongue member into engagement with the notch in said sleeve, to thereby limit the longitudinal movement of said sleeve in one direction within said cavity.

3. The brush holder according to claim 1 or 2, wherein said notch is located in a portion of said sleeve which is recessed from the surface of a brush disposed therein, and wherein said stop member projects into said sleeve at a right angle to said recessed portion.

4. The brush holder according to claim 3 wherein said sleeve is adapted to support a brush having a rectangular cross section, and said recessed portion is formed by a curvilinear section on said sleeve.

5. The brush holder according to claim 1, 3, 2, or 4, wherein said stop member projects into said sleeve a distance sufficient to form an abutment for a compression spring disposed in said sleeve, to thereby limit movement of the spring as a brush wears down.

6. The brush holder according to claim 1 or 2 further including means on said support for limiting longitudinal movement of said sleeve in the other direction within said cavity.

7. The brush holder according to claim 6 wherein said limiting means is a plate mounted on said support.

8. The brush holder according to claim 6 wherein said plate is mounted on said support by means of elastic tongues on said support having stop members that engage the surface of said plate that is opposite said sleeve.

* * * * *